(12) United States Patent
Hong

(10) Patent No.: US 11,418,981 B2
(45) Date of Patent: Aug. 16, 2022

(54) DRIVE TEST INFORMATION REPORTING METHOD AND DEVICE, NETWORK PERFORMANCE DETECTION AND DEVICE

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 79 days.

(21) Appl. No.: 16/956,558

(22) PCT Filed: Dec. 22, 2017

(86) PCT No.: PCT/CN2017/118036
§ 371 (c)(1),
(2) Date: Jun. 20, 2020

(87) PCT Pub. No.: WO2019/119427
PCT Pub. Date: Jun. 27, 2019

(65) Prior Publication Data
US 2021/0377762 A1    Dec. 2, 2021

(51) Int. Cl.
*H04W 24/08*    (2009.01)
*H04W 4/33*    (2018.01)

(52) U.S. Cl.
CPC .......... *H04W 24/08* (2013.01); *H04W 4/33* (2018.02)

(58) Field of Classification Search
CPC ...... H04W 24/10; H04W 24/02; H04W 64/00
See application file for complete search history.

(56) References Cited

U.S. PATENT DOCUMENTS

| 8,831,586 B2 | 9/2014 | Gao et al. |
| 8,873,408 B2 | 10/2014 | Siomina et al. |
| (Continued) | | |

FOREIGN PATENT DOCUMENTS

| CN | 101931984 A | 12/2010 |
| CN | 101990230 A | 3/2011 |
| (Continued) | | |

OTHER PUBLICATIONS

International Search Report in International Application No. PCT/CN2017/118036, dated Sep. 13, 2018.

(Continued)

*Primary Examiner* — Kevin Kim
(74) *Attorney, Agent, or Firm* — Finnegan, Henderson, Farabow, Garrett & Dunner, L.L.P.

(57) ABSTRACT

A drive test information reporting method is performed by user equipment (UE) indoors, the UE being a device with a wireless short-distance communication function. The method includes: detecting related information of another wireless short-distance communication device; recording and storing the related information of the another wireless short-distance communication device and corresponding detection time points; recording and storing network signal quality at each detection time point; and reporting drive test information to a base station at a preset reporting moment, the drive test information including the related information of the another wireless short-distance communication device, the corresponding detection time points and the network signal quality at each detection time point.

16 Claims, 11 Drawing Sheets

(56) References Cited

U.S. PATENT DOCUMENTS

| | | |
|---|---|---|
| 2012/0012081 A1 | 5/2012 | Wang et al. |
| 2012/0113837 A1 | 5/2012 | Siomina et al. |
| 2013/0012188 A1 | 1/2013 | Gao et al. |
| 2014/0301511 A1 | 10/2014 | Wax et al. |
| 2015/0117238 A1 | 4/2015 | Kronestedt et al. |
| 2017/0019795 A1* | 1/2017 | Takahashi ............. H04W 16/18 |
| 2017/0215099 A1* | 7/2017 | Han ...................... H04W 24/10 |
| 2017/0303153 A1 | 10/2017 | Siomina et al. |
| 2018/0338250 A1* | 11/2018 | Mishra .................. H04W 24/10 |

FOREIGN PATENT DOCUMENTS

| | | |
|---|---|---|
| CN | 102209343 A | 10/2011 |
| CN | 202103680 U | 1/2012 |
| CN | 102547840 A | 7/2012 |
| CN | 103781095 A | 5/2014 |
| CN | 104186015 A | 12/2014 |
| CN | 204614229 U | 9/2015 |
| CN | 204614299 U | 9/2015 |
| CN | 105723776 A | 6/2016 |
| CN | 108353371 A | 7/2018 |
| EP | 2 536 197 A1 | 12/2012 |
| EP | 3079382 A1 * | 10/2016 .............. H04W 4/08 |
| WO | WO 2012/060761 A1 | 5/2012 |

OTHER PUBLICATIONS

English Translation of the Written Opinion of the International Search Authority in International Application No. PCT/CN2017/118036, dated Sep. 13, 2018.

Supplementary European Search Report in European Application No. 17935661.3, dated Nov. 23, 2020.

First Office Action of Chinese Application No. 201780002379.1, dated Jun. 1, 2021.

* cited by examiner

DRIVE TEST INFORMATION REPORTING METHOD AND DEVICE, NETWORK PERFORMANCE DETECTION AND DEVICE

CROSS REFERENCE TO RELATED APPLICATIONS

This application is a national phase application based on PCT/CN2017/118036, filed Dec. 22, 2017, the content of which is incorporated herein by reference.

TECHNICAL FIELD

The present disclosure generally relates to the technical field of communication, and more particularly, to a method and device for reporting drive test information, a network performance detection method and device, user equipment, a base station and a computer-readable storage medium.

BACKGROUND

Drive test is a most common method for testing a wireless signal of a road in the communication industry. Drive test may reflect a condition of a network, play a direct role in measuring and evaluating a performance index of the network and indicate a problem of the network. Conventional network optimization is based on drive test data. Network data such as level, quality and the like may be acquired through a drive test instrument, the data may be analyzed to find a network problem, and network optimization may be further performed in a problem region. Such a manner usually requires heavy human resource, material resource and fund investments and also has a very high requirement on experience of a network optimization worker. According to a Minimization of Drive Tests (MDT) technology defined by the 3rd Generation Partnership Project (3GPP), a related parameter required by network optimization may be mainly acquired through a measurement report from a mobile phone. Through the MDT technology, 1) a drive test overhead may be reduced, and an optimization period may be shortened, so that network optimization and maintenance cost of a mobile communications operating company is reduced; 2) measurement information of a full region where conventional drive test cannot be performed, for example, measurement information of a narrow road, a forest and a private place, may be collected, so that network performance may be evaluated more objectively, a network evaluation result may be closer to a user experience, and user satisfaction may be higher; and 3) conventional drive tests may be reduced, so that emissions of carbon dioxide may be reduced and the environment may be protected.

For making MDT more effective, present application scenarios thereof mainly include coverage optimization, capacity optimization, mobility optimization, Quality of Service (QoS) guaranteeing and the like.

At present, the MDT technology is mainly applied to an outdoor scenario. In the outdoor scenario, UE may perform accurate positioning and information reporting based on a Global Positioning System (GPS). However, along with development of mobile communication technologies, more and more mobile communications and traffic may be generated indoors, moreover, more and more Bluetooth (BT) devices and Wireless Fidelity (WIFI) Internet access devices may be deployed indoors, and a conventional MDT technology is got challenged. For example, the GPS that conventional MDT is based on may not work normally indoors, resulting in positioning inaccuracy. Therefore, how to apply the MDT technology to an indoor scenario is a technical problem that needs to be solved.

SUMMARY

In view of this, the present application discloses a method and device for reporting drive test information, a network performance detection method and device, UE, a base station and a computer-readable storage medium, to determine an indoor network coverage problem region.

According to a first aspect of embodiments of the present disclosure, a method for reporting drive test information may be applied to UE indoors, the UE being a device with a wireless short-distance communication function, the method including:

detecting related information of another wireless short-distance communication device;

recording and storing the related information of the another wireless short-distance communication device and detection time points for the related information;

recording and storing network signal quality at each of the detection time points; and reporting drive test information to a base station at a preset reporting moment, the drive test information including the related information of the another wireless short-distance communication device, the detection time points for the related information and the network signal quality at each of the detection time points.

In an embodiment, the UE may include a BT device and/or a WIFI device, the another wireless short-distance communication device may include a BT device and/or a WIFI device, and the WIFI device may include a WIFI access point (AP) and a WIFI station (STA).

In an embodiment, in a case that the another wireless short-distance communication device includes the BT device, the related information of the another wireless short-distance communication device may include at least one of a Media Access Control (MAC) address and a signal strength of the BT device; or in a case that the another wireless short-distance communication device includes the WIFI device, the related information of the another wireless short-distance communication device may include at least one of a MAC address, a signal strength, and a Service Set Identifier (SSID) of the WIFI device.

In an embodiment, the method may further include:

predetermining the reporting moment with the base station; or receiving configuration information from the base station, and acquiring the reporting moment from the configuration information.

According to a second aspect of the embodiments of the present disclosure, a network performance detection method may be applied to a base station and may include:

receiving drive test information from UE indoors which is a device with a wireless short-distance communication function, the drive test information including related information of another wireless short-distance communication device, detection time points for the related information and network signal quality at each of the detection time points; and determining a network coverage problem region according to the drive test information.

In an embodiment, the method may further include:

performing coverage enhancement on the network coverage problem region after determining the network coverage problem region according to the drive test information.

In an embodiment, the UE may include a BT device and/or a WIFI device, the another wireless short-distance communication device may include a BT device and/or a WIFI device, and the WIFI device may include a WIFI AP and a WIFI STA.

In an embodiment, in a case that the another wireless short-distance communication device includes the BT device, the related information of the another wireless short-distance communication device may include at least one of a MAC address and a signal strength of the BT device; or in a case that the another wireless short-distance communication device includes the WIFI device, the related information of the another wireless short-distance communication device may include at least one of a MAC address, a signal strength, and a SSID of the WIFI device.

In an embodiment, the determining the network coverage problem region according to the drive test information may include:

determining a region where the network signal quality is lower than a preset threshold to be the network coverage problem region.

In an embodiment, the method may further include:

predetermining with the UE a reporting moment for reporting the drive test information; or sending configuration information to the UE to enable the UE to acquire from the configuration information a reporting moment for reporting the drive test information.

According to a third aspect of embodiments of the present disclosure, a device for reporting drive test information may be applied to UE indoors, the UE being a device with a wireless short-distance communication function, the device including:

a detection module, configured to detect related information of another wireless short-distance communication device;

a first recording and storing module, configured to record and store the related information, detected by the detection module, of the another wireless short-distance communication device and detection time points for the related information;

a second recording and storing module, configured to record and store network signal quality at each of the detection time points stored by the first recording and storing module; and a reporting module, configured to report drive test information to a base station at a preset reporting moment, the drive test information including the related information of the another wireless short-distance communication device and the detection time points for the related information stored by the first recording and storing module, and the network signal quality at each of the detection time points stored by the second recording and storing module.

In an embodiment, the UE may include a BT device and/or a WIFI device, the another wireless short-distance communication device may include a BT device and/or a WIFI device, and the WIFI device may include a WIFI AP and a WIFI station (STA).

In an embodiment, in a case that the another wireless short-distance communication device includes the BT device, the related information of the another wireless short-distance communication device may include at least one of a MAC address and a signal strength of the BT device; or in a case that the another wireless short-distance communication device includes the WIFI device, the related information of the another wireless short-distance communication device may include at least one of a MAC address, a signal strength, and a SSID of the WIFI device.

In an embodiment, the device may further include:

a predetermination module, configured to predetermine the reporting moment when the reporting module reports the drive test information with the base station; or a receiving and acquisition module, configured to receive configuration information from the base station and acquire, from the configuration information, the reporting moment when the reporting module reports the drive test information.

According to a fourth aspect of the embodiments of the present disclosure, a network performance detection device may be applied to a base station and may include:

a receiving module, configured to receive drive test information from UE indoors which is a device with a wireless short-distance communication function, the drive test information including related information of another wireless short-distance communication device, detection time points for the related information and network signal quality at each of the detection time points; and a determination module, configured to determine a network coverage problem region according to the drive test information received by the receiving module.

In an embodiment, the device may further include:

an enhancement module, configured to perform coverage enhancement on the network coverage problem region after the determination module determines the network coverage problem region according to the drive test information.

In an embodiment, the UE may include a BT device and/or a WIFI device, the another wireless short-distance communication device may include a BT device and/or a WIFI device, and the WIFI device may include a WIFI AP and a WIFI station (STA).

In an embodiment, in a case that the another wireless short-distance communication device includes the BT device, the related information of the another wireless short-distance communication device may include at least one of a MAC address and a signal strength of the BT device; or in a case that the another wireless short-distance communication device includes the WIFI device, the related information of the another wireless short-distance communication device may include at least one of a MAC address, a signal strength, and a SSID of the WIFI device.

In an embodiment, the determination module may be configured to:

determine a region where the network signal quality is lower than a preset threshold to be the network coverage problem region.

In an embodiment, the device may further include:

a predetermination module, configured to predetermine with the UE a reporting moment when the UE reports the drive test information received by the receiving module; or a sending module, configured to send configuration information to the UE to enable the UE to acquire, from the configuration information, a reporting moment when the UE reports the drive test information received by the receiving module.

According to a fifth aspect of the embodiments of the present disclosure, UE may include:

a processor; and a memory configured to store instructions executable by the processor, wherein the processor may be configured to:

detect related information of another wireless short-distance communication device;

record and store the related information of the another wireless short-distance communication device and detection time points for the related information;

record and store network signal quality at each of the detection time points; and report drive test information to a base station at a preset reporting moment, the drive test information including the related information of the another wireless short-distance communication device, the detection time points for the related information and the network signal quality at each of the detection time points.

According to a sixth aspect of the embodiments of the present disclosure, a base station may include:

a processor; and a memory configured to store instructions executable by the processor, wherein the processor may be configured to:

receive drive test information from UE indoors which is a device with a wireless short-distance communication function, the drive test information including related information of another wireless short-distance communication device, detection time points for the related information and network signal quality at each of the detection time points; and determine a network coverage problem region according to the drive test information.

According to a seventh aspect of the embodiments of the present disclosure, a computer-readable storage medium may have computer instructions stored thereon that, when executed by a processor, may implement the steps of the method for reporting drive test information.

According to an eighth aspect of the embodiments of the present disclosure, a computer-readable storage medium may have computer instructions stored thereon that, when executed by a processor, may implement the steps of the network performance detection method.

The technical solutions provided in the embodiments of the present disclosure may have beneficial effects.

Detected related information of another wireless short-distance communication device, detection time points for detecting the related information and the network signal quality at each of the detection time points may be recorded and stored, and drive test information including the related information of the another wireless short-distance communication device, the detection time points for the related information and the network signal quality at each of the detection time points may be reported to a base station at a preset reporting moment, so that the base station may determine the indoor network coverage problem region according to the drive test information.

The drive test information reported by the UE indoors may be received, and the indoor network coverage problem region may be determined according to the drive test information.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
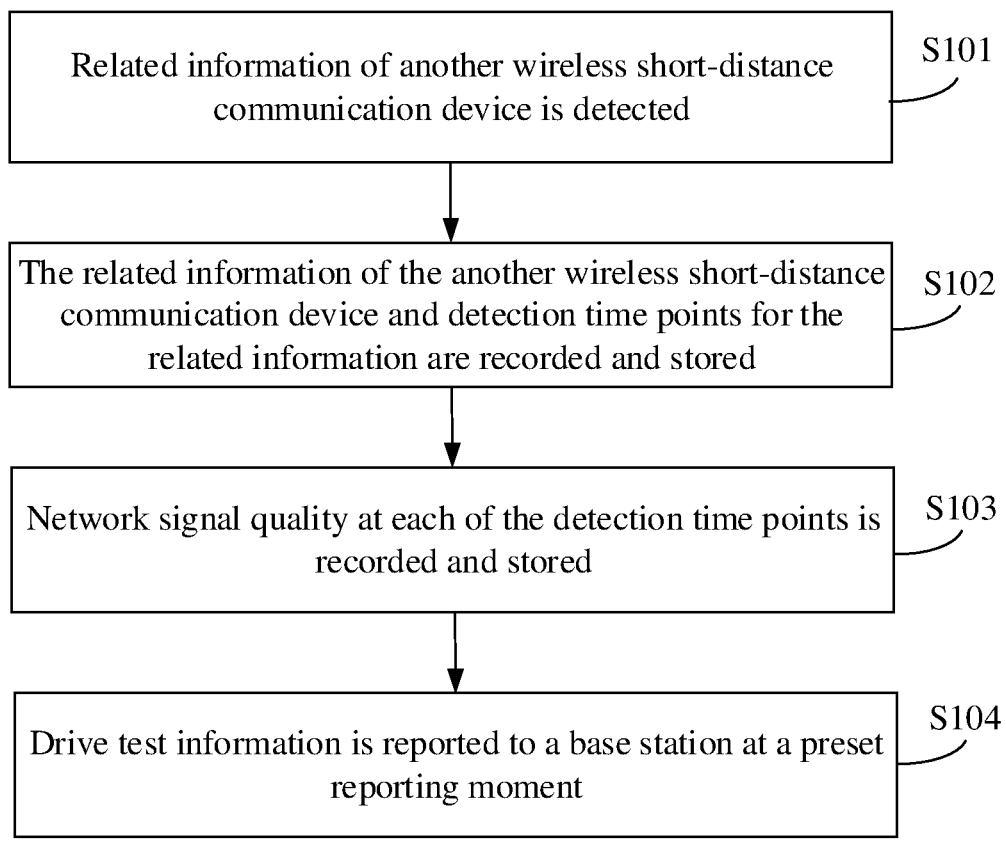
FIG. 1 is a flowchart showing a method for reporting drive test information according to an exemplary embodiment of the present application.

FIG. 1 is a flowchart showing a method for reporting drive test information according to an exemplary embodiment of the present application. The embodiment is described from a user equipment (UE) side. UE may be indoors and may be a device with a wireless short-distance communication function. As shown in FIG. 1, the method for reporting drive test information may include the following steps.

In step S101, related information of another wireless short-distance communication device is detected.

The UE may include, but is not limited to, at least one of a BT device and a WIFI device. The another wireless short-distance communication device may include, but is not limited to, at least one of a BT device and a WIFI device. The WIFI device may include a WIFI access point (AP) and a WIFI station (STA).

In the embodiment, the UE with the wireless short-distance communication function, after getting indoors, may start periodically detecting related information of other wireless short-distance communication device(s) around. When other wireless short-distance communication device(s) include the BT device, the related information of other wireless short-distance communication device(s) may include, but are not limited to, at least one of a Media Access Control (MAC) address and a signal strength of the BT device. When other wireless short-distance communication device(s) include the WIFI device, the related information of other wireless short-distance communication device(s) may include, but are not limited to, at least one of a MAC address, a signal strength, and a Service Set Identifier (SSID) of the WIFI device.

In step S102, the related information of the another wireless short-distance communication device and detection time points for the related information are recorded and stored.

In step S103, network signal quality at each of the detection time points is recorded and stored.

In step S104, drive test information is reported to a base station at a preset reporting moment, the drive test information including the related information of the another wireless short-distance communication device, the detection time points for the related information and the network signal quality at each of the detection time points.

The reporting moment may be predetermined by the UE and the base station, or may be acquired from configuration information after the configuration information sent by the base station is received by the UE.

According to the embodiments, the detected related information of the another wireless short-distance communication device, the detection time points for the related information and the network signal quality at each of the detection time points may be recorded and stored, and the drive test information including the related information of the another wireless short-distance communication device, the detection time points for the related information and the network signal quality at each of the detection time points may be reported to the base station at the preset reporting moment, so that the base station may determine an indoor network coverage problem region according to the drive test information.

Figure 2:
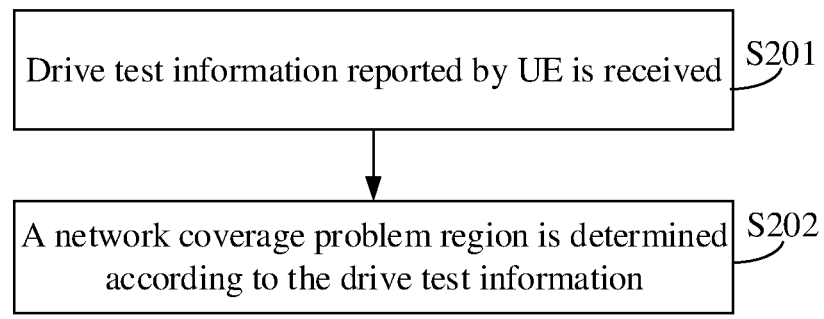
FIG. 2 is a flowchart showing a network performance detection method according to an exemplary embodiment of the present application.

FIG. 2 is a flowchart showing a network performance detection method according to an exemplary embodiment of the present application. The embodiment is described from a base station side. As shown in FIG. 2, the network performance detection method includes the following steps.

In step S201, drive test information reported by UE is received, the UE being a device with a wireless short-distance communication function indoors, and the drive test information including related information of another wireless short-distance communication device, detection time points for the related information and network signal quality at each of the detection time points.

The UE may include, but is not limited to, at least one of a BT device and a WIFI device. The another wireless short-distance communication device may include, but is not limited to, at least one of a BT device and a WIFI device. The WIFI device may include a WIFI AP and a WIFI STA.

When the another wireless short-distance communication device includes the BT device, the related information of the another wireless short-distance communication device may include, but is not limited to, at least one of a MAC address and a signal strength of the BT device. When the another wireless short-distance communication device includes the WIFI device, the related information of the another wireless short-distance communication device may include, but is not limited to, at least one of a MAC address, a signal strength, and an SSID of the WIFI device.

In step S202, a network coverage problem region is determined according to the drive test information.

In the embodiments, a base station, after receiving the drive test information, may determine which wireless short-distance communication device(s) have a network coverage problem. In the embodiment, a region where the network signal quality is lower than a preset threshold may be determined as the network coverage problem region. The preset threshold may be flexibly set as required. If the network signal quality in a region where WIFI device 1 is located is lower than preset threshold 1, the region where the WIFI device 1 is located may be determined as the network coverage problem region.

According to the embodiments, drive test information reported by the UE indoors may be received, and an indoor network coverage problem region may be determined according to the drive test information.

Figure 3:
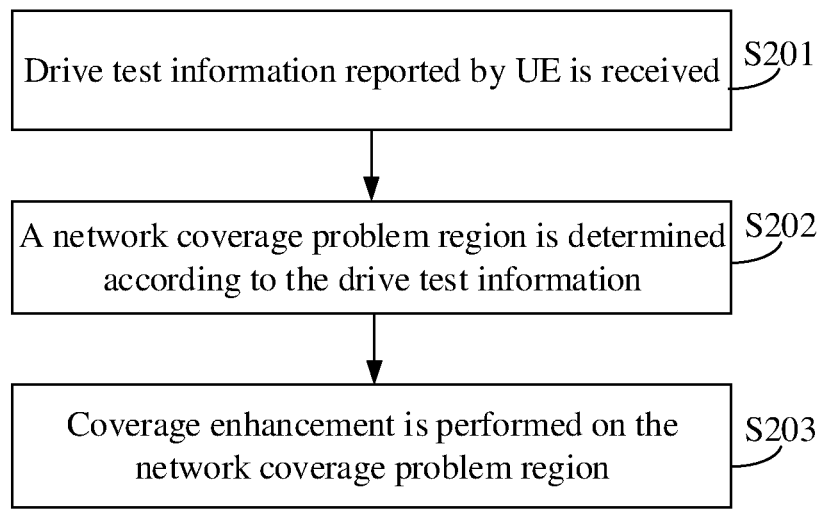
FIG. 3 is a flowchart showing another network performance detection method according to an exemplary embodiment of the present application.

FIG. 3 is a flowchart showing another network performance detection method according to an exemplary embodiment of the present application. As shown in FIG. 3, after the step S202, the network performance detection method may further include that:

in step S203, coverage enhancement is performed on the network coverage problem region.

In the embodiment, after the network coverage problem region is determined, a further coverage enhancement measure may be taken. For example, an additional base station may be added to the network coverage problem region to enhance network coverage.

According to the embodiment, coverage enhancement may be performed on the network coverage problem region to enhance the network coverage of the problem region.

Figure 4:
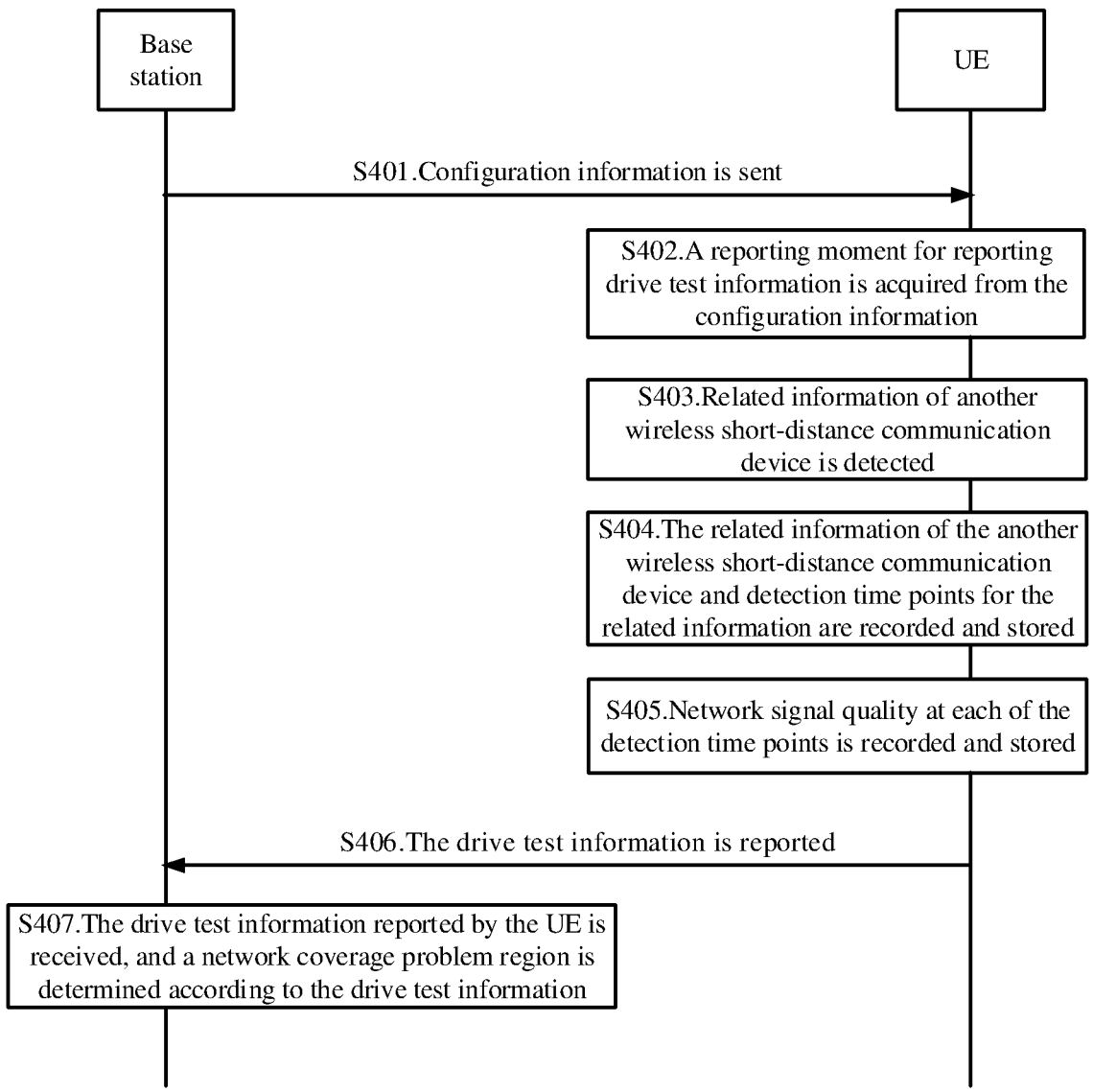
FIG. 4 is a signaling flowchart showing a network performance detection method according to an exemplary embodiment of the present application.

FIG. 4 is a signaling flowchart showing a network performance detection method according to an exemplary embodiment of the present application. The embodiment is described from the angle of interaction between a base station and UE which is indoors. As shown in FIG. 4, the network performance detection method may include the following steps.

In step S401, the base station sends configuration information to the UE.

In step S402, the UE acquires a reporting moment for reporting drive test information from the configuration information.

In step S403, the UE detects related information of another wireless short-distance communication device.

In step S404, the UE records and stores the related information of the another wireless short-distance communication device and detection time points for the related information.

In step S405, the UE records and stores network signal quality at each of the detection time points.

In step S406, the UE reports the drive test information to the base station at the acquired reporting moment, the drive test information including the related information of the another wireless short-distance communication device, the detection time points for the related information and the network signal quality at each of the detection time points.

There is no strict execution sequence between Step 401 to Step 402 and Step 403 to Step 405.

In step S407, the base station receives the drive test information reported by the UE and determines a network coverage problem region according to the drive test information.

According to the embodiment, through the interaction between the UE and the base station, the UE may report the drive test information including the related information of the another wireless short-distance communication device, the detection time points for the related information and the network signal quality at each of the detection time points to the base station, and then the base station may determine the indoor network coverage problem region according to the drive test information. An implementation manner is simple.

Figure 5:
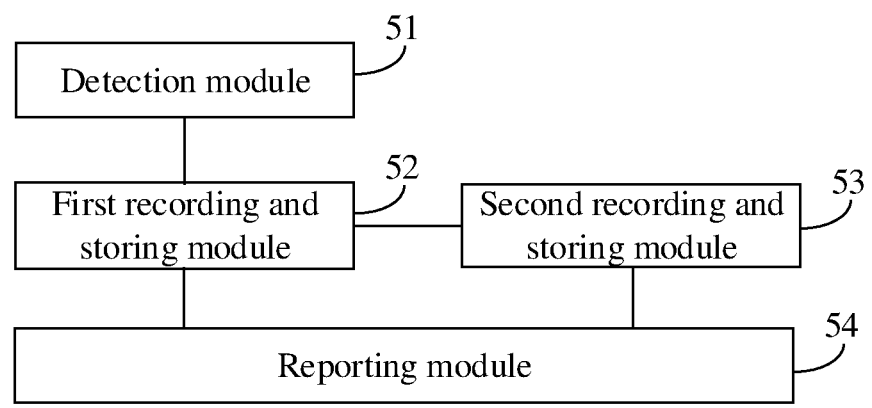
FIG. 5 is a block diagram of a device for reporting drive test information according to an exemplary embodiment.

FIG. 5 is a block diagram of a device for reporting drive test information according to an exemplary embodiment.

The device may be in UE indoors, and the UE may be a device with a wireless short-distance communication function. As shown in FIG. 5, the device for reporting drive test information may include a detection module 51, a first recording and storing module 52, a second recording and storing module 53, and a reporting module 54.

The detection module 51 is configured to detect related information of another wireless short-distance communication device.

The UE may include, but is not limited to, at least one of a BT device and a WIFI device. The another wireless short-distance communication device may include, but is not limited to, at least one of a BT device and a WIFI device. The WIFI device may include a WIFI AP and a WIFI STA.

In the embodiment, the UE with the wireless short-distance communication function, after getting indoors, may start periodically detecting the related information of other wireless short-distance communication device(s) around. When other wireless short-distance communication device(s) include the BT device, the related information of other wireless short-distance communication device(s) may include, but are not limited to, at least one of a MAC address and a signal strength of the BT device. When other wireless short-distance communication device(s) include the WIFI device, the related information of other wireless short-distance communication device(s) may include, but are not limited to, at least one of a MAC address, a signal strength, and an SSID of the WIFI device.

The first recording and storing module 52 is configured to record and store the related information, detected by the detection module 51, of the another wireless short-distance communication device and detection time points for the related information.

The second recording and storing module 53 is configured to record and store network signal quality at each of the detection time points stored by the first recording and storing module 52.

The reporting module 54 is configured to report drive test information to a base station at a preset reporting moment, the drive test information including the related information of the another wireless short-distance communication device, the detection time points stored by the first recording and storing module 52 and the network signal quality, stored by the second recording and storing module 53, at each of the detection time points.

The reporting moment may be predetermined by the UE and the base station, or may be acquired from configuration information after the configuration information sent by the base station is received by the UE.

According to the embodiments, the detected related information of another wireless short-distance communication device, the detection time points for the related information and the network signal quality at each of the detection time points may be recorded and stored, and drive test information including the related information of the another wireless short-distance communication device, the detection time points for the related information and the network signal quality at each of the detection time points may be reported to the base station at the preset reporting moment, so that the base station may determine an indoor network coverage problem region according to the drive test information.

Figure 6:
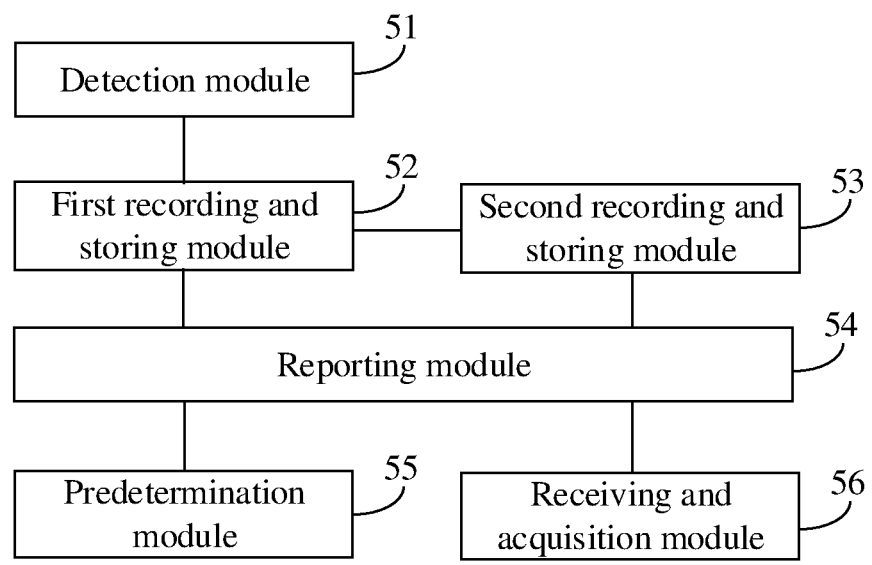
FIG. 6 is a block diagram of another device for reporting drive test information according to an exemplary embodiment.

FIG. 6 is a block diagram of another device for reporting drive test information according to an exemplary embodiment. As shown in FIG. 6, based on the embodiment shown in FIG. 5, the device may further include at least one of a predetermination module 55 and a receiving and acquisition module 56.

The predetermination module 55 is configured to predetermine with the base station the reporting moment when the reporting module 54 reports the drive test information.

The receiving and acquisition module 56 is configured to receive configuration information from the base station and acquire, from the configuration information, the reporting moment when the reporting module 54 reports the drive test information.

The reporting moment may be predetermined by the UE and the base station, or may be acquired from configuration information after the configuration information sent by the base station is received.

According to the embodiment, the reporting moment for reporting the drive test information may be predetermined or may be acquired from the received configuration information. The implementation manners can be flexible.

Figure 7:
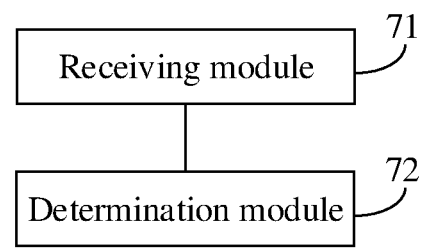
FIG. 7 is a block diagram of a network performance detection device according to an exemplary embodiment.

FIG. 7 is a block diagram of a network performance detection device according to an exemplary embodiment. The network performance detection device may be in a base station. As shown in FIG. 7, the network performance detection device may include a receiving module 71 and a determination module 72.

The receiving module 71 is configured to receive drive test information from UE indoors which is a device with a wireless short-distance communication function, the drive test information including related information of another wireless short-distance communication device, detection time points for the related information and network signal quality at each of the detection time points.

The UE may include, but is not limited to, at least one of a BT device and a WIFI device. The another wireless short-distance communication device may include, but is not limited to, at least one of a BT device and a WIFI device. The WIFI device may include a WIFI AP and a WIFI STA.

When the another wireless short-distance communication device includes the BT device, the related information of the another wireless short-distance communication device may include, but is not limited to, at least one of a MAC address and signal strength of the BT device. When the another wireless short-distance communication device includes the WIFI device, the related information of the another wireless short-distance communication device may include, but is not limited to, at least one of a MAC address, a signal strength, and an SSID of the WIFI device.

The determination module 72 is configured to determine a network coverage problem region according to the drive test information received by the receiving module 71.

In the embodiment, the base station, after receiving the drive test information, may determine a specific wireless short-distance communication device where there is a network coverage problem. In the embodiment, a region where the network signal quality is lower than a preset threshold may be determined as the network coverage problem region. The preset threshold may be flexibly set as required. If the network signal quality in a region where WIFI device 1 is located is lower than preset threshold 1, the region where the WIFI device 1 is located may be determined as the network coverage problem region.

According to the embodiments, the drive test information reported by the UE indoors may be received, and the indoor network coverage problem region may be determined according to the drive test information.

Figure 8:
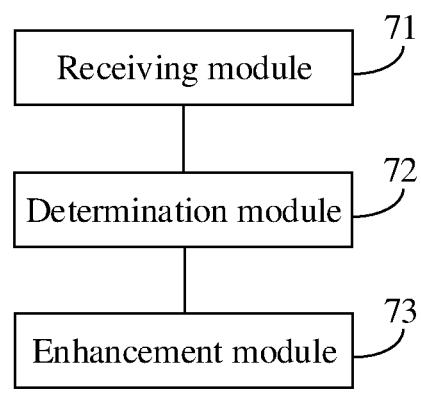
FIG. 8 is a block diagram of another network performance detection device according to an exemplary embodiment.

FIG. 8 is a block diagram of another network performance detection device according to an exemplary embodiment. As shown in FIG. 8, based on the embodiment shown in FIG. 7, the device may further include an enhancement module 73.

The enhancement module 73 is configured to, after the determination module 72 determines the network coverage problem region according to the drive test information, perform coverage enhancement on the network coverage problem region.

In the embodiment, after the network coverage problem region is determined, a further coverage enhancement measure may be taken. For example, an additional base station may be added to the network coverage problem region to enhance network coverage.

According to the embodiments, coverage enhancement may be performed on the network coverage problem region to achieve the purpose of enhancing the network coverage of the problem region.

Figure 9:
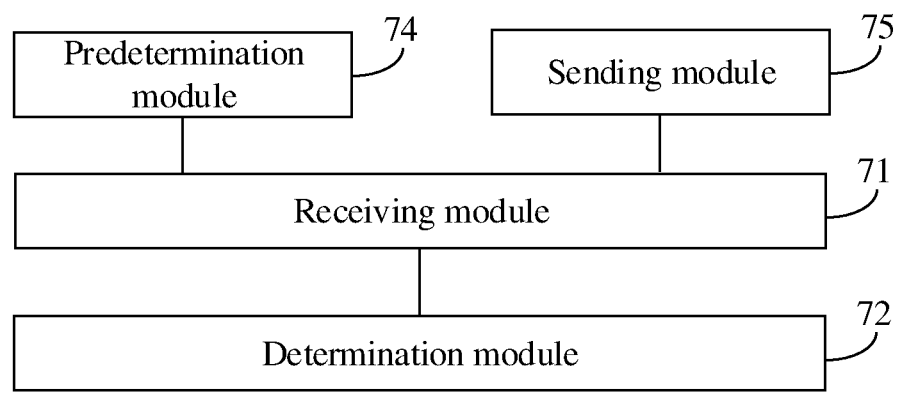
FIG. 9 is a block diagram of another network performance detection device according to an exemplary embodiment.

FIG. 9 is a block diagram of another network performance detection device according to an exemplary embodiment. As shown in FIG. 9, based on the embodiment shown in FIG. 7, the network performance detection device may further include at least one of a predetermination module 74 and a sending module 75.

The predetermination module 74 is configured to predetermine with the UE the reporting moment when the UE reports the drive test information received by the receiving module 71.

The sending module 75 is configured to send configuration information to the UE to enable the UE to acquire, from the configuration information, the reporting moment when the UE reports the drive test information received by the receiving module 71.

According to the embodiments, the reporting moment for reporting the drive test information may be predetermined between the base station and the UE, or may be acquired from configuration information after the configuration information is sent to the UE by the base station. The implementation manners can be flexible.

Figure 10:
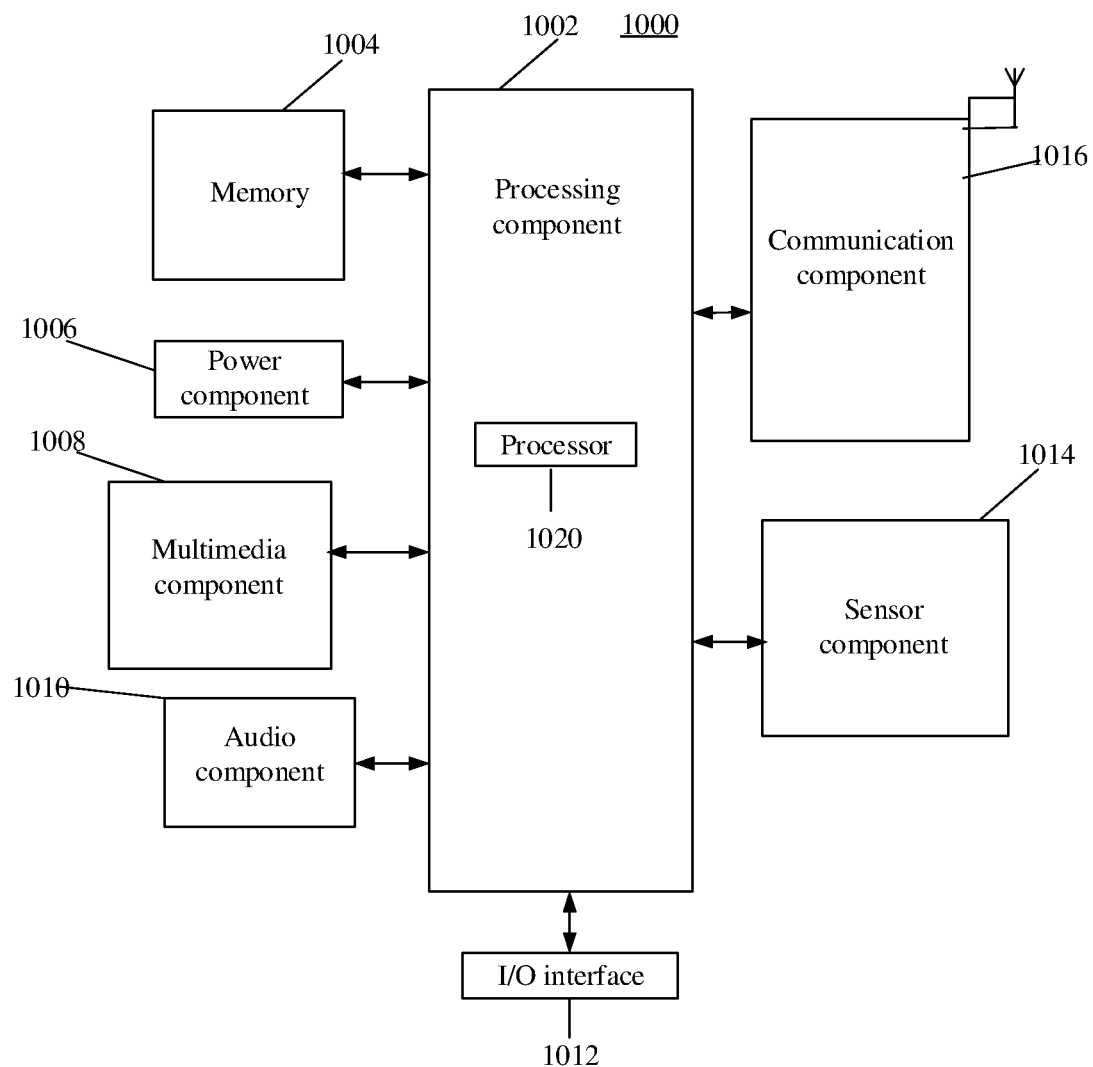
FIG. 10 is a block diagram of a device applied to reporting of drive test information according to an exemplary embodiment.

FIG. 10 is a block diagram of a device applied to reporting of drive test information according to an exemplary embodiment. For example, the device 1000 may be UE such as a mobile phone, a computer, a digital broadcast terminal, a messaging device, a gaming console, a tablet, a medical device, exercise equipment and a personal digital assistant.

Referring to FIG. 10, the device 1000 may include one or more of the following components: a processing component 1002, a memory 1004, a power component 1006, a multimedia component 1008, an audio component 1010, an Input/Output (I/O) interface 1012, a sensor component 1014, and a communication component 1016.

The processing component 1002 is typically configured to control overall operations of the device 1000, such as the operations associated with display, telephone calls, data communications, camera operations, and recording operations. The processing component 1002 may include one or more processors 1020 to execute instructions to perform all or part of the steps in the abovementioned method. Moreover, the processing component 1002 may include one or more modules which facilitate interaction between the processing component 1002 and other components. For instance, the processing component 1002 may include a multimedia module to facilitate interaction between the multimedia component 1008 and the processing component 1002.

One processor 1020 in the processing component 1002 may be configured to:

detect related information of another wireless short-distance communication device;

record and store the related information of the another wireless short-distance communication device and detection time points for the related information;

record and store network signal quality at each of the detection time points; and report drive test information to a base station at a preset reporting moment, the drive test information including the related information of the another wireless short-distance communication device, the detection time points for the related information and the network signal quality at each of the detection time points.

The memory 1004 is configured to store various types of data to support the operation of the device 1000. Examples of such data include instructions for any applications or methods operated on the device 1000, contact data, phonebook data, messages, pictures, video, etc. The memory 1004 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1006 is configured to provide power for various components of the device 1000. The power component 1006 may include a power management system, one or more power supplies, and other components associated with generation, management and distribution of power for the device 1000.

The multimedia component 1008 may include a screen providing an output interface between the device 1000 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1008 includes a front camera and/or a rear camera. The front camera and/or the rear camera may receive external multimedia data when the device 1000 is in an operation mode, such as a photographing mode or a video mode. Each of the front camera and the rear camera may be a fixed optical lens system or have focusing and optical zooming capabilities.

The audio component 1010 is configured to output and/or input an audio signal. For example, the audio component 1010 includes a Microphone (MIC), and the MIC is configured to receive an external audio signal when the device 1000 is in the operation mode, such as a call mode, a recording mode and a voice recognition mode. The received audio signal may further be stored in the memory 1004 or sent through the communication component 1016. In some embodiments, the audio component 1010 further includes a speaker configured to output the audio signal.

The I/O interface 1012 is configured to provide an interface between the processing component 1002 and a peripheral interface module, and the peripheral interface module may be a keyboard, a click wheel, a button and the like. The button may include, but is not limited to: a home button, a volume button, a starting button and a locking button.

The sensor component 1014 may include one or more sensors configured to provide status assessment in various aspects for the device 1000. For instance, the sensor component 1014 may detect an on/off status of the device 1000 and relative positioning of components, such as a display and small keyboard of the device 1000, and the sensor component 1014 may further detect a change in a position of the device 1000 or a component of the device 1000, presence or absence of contact between the user and the device 1000, orientation or acceleration/deceleration of the device 1000 and a change in temperature of the device 1000. The sensor component 1014 may include a proximity sensor configured to detect presence of an object nearby without any physical contact. The sensor component 1014 may also include a light sensor, such as a Complementary Metal Oxide Semiconductor (CMOS) or Charge Coupled Device (CCD) image sensor, configured for use in an imaging application. In some embodiments, the sensor component 1014 may also include an acceleration sensor, a gyroscope sensor, a magnetic sensor, a pressure sensor or a temperature sensor.

The communication component 1016 is configured to facilitate wired or wireless communication between the device 1000 and another device. The device 1000 may access a communication-standard-based wireless network, such as a WIFI network, a 2nd-Generation (2G) or 3rd-Generation (3G) network or a combination thereof. In an exemplary embodiment, the communication component 1016 may receive a broadcast signal or broadcast associated information from an external broadcast management system through a broadcast channel. In an exemplary embodiment, the communication component 1016 may further include a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a BT technology and another technology.

In an exemplary embodiment, the device 1000 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including instructions, such as the memory 1004 including instructions, and the instructions may be executed by the processor 1020 of the device 1000 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Figure 11:
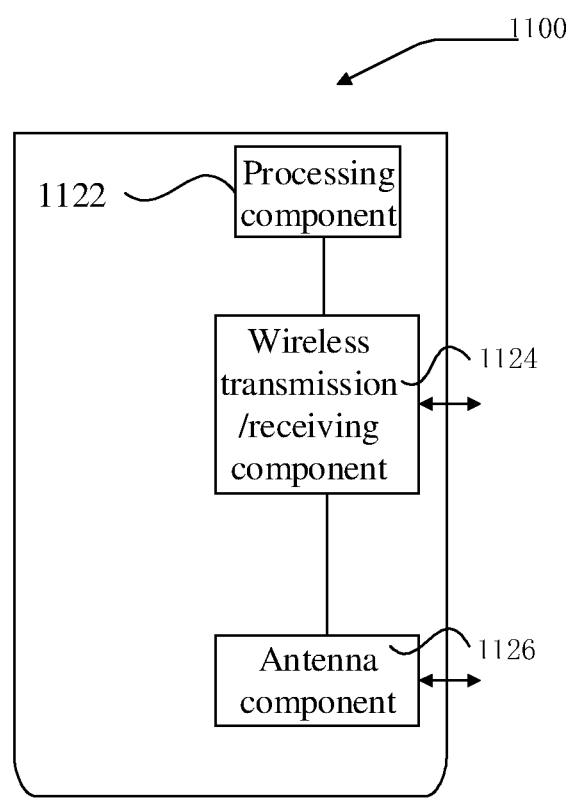
FIG. 11 is a block diagram of a device applied to network performance detection according to an exemplary embodiment.

FIG. 11 is a block diagram of a device applied to network performance detection according to an exemplary embodiment. The device 1100 may be provided as a base station. Referring to FIG. 11, the device 1100 includes a processing component 1122, a wireless transmission/receiving component 1124, an antenna component 1126 and a wireless interface-specific signal processing part, and the processing component 1122 may further include one or more processors.

One processor in the processing component 1122 may be configured to:

receive drive test information reported by UE indoors which is a device with a wireless short-distance communication function, the drive test information including related information of another wireless short-distance communication device, detection time points for the related information and network signal quality at each of the detection time points; and determine a network coverage problem region according to the drive test information.

In an exemplary embodiment, there is also provided a non-transitory computer-readable storage medium including instructions, and the instructions may be executed by the processing component 1122 of the device 1100 to implement the network performance detection method. For example, the non-transitory computer-readable storage medium may be a ROM, a RAM, a CD-ROM, a magnetic tape, a floppy disc, an optical data storage device and the like.

The device embodiments substantially correspond to the method embodiments, and thus related parts refer to part of descriptions of the method embodiments. The device embodiments described above are only schematic. The units described as separate parts therein may or may not be physically separated. The parts displayed as units may or may not be physical units, namely, may be located in the same place or may also be distributed to multiple network units. Part or all of the modules therein may be selected according to a practical requirement to achieve the purpose of the solutions of the embodiments. Those of ordinary skill in the art may understand and implement without creative work.

It is to be noted that relational terminologies "first", "second" and the like in the present disclosure are adopted only to distinguish one entity or operation from another entity or operation and not always to require or imply existence of any such practical relationship or sequence between the entities or operations. Terminologies "include" and "have" or any other variation thereof is intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an . . . " does not exclude existence of another element that is the same in a process, method, object or device including the element.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for reporting drive test information, performed by user equipment (UE) indoors, the UE being a device with a wireless short-distance communication function, the method comprising:

detecting related information of another wireless short-distance communication device;

recording and storing the related information of the another wireless short-distance communication device and detection time points for the related information;

recording and storing network signal quality at each of the detection time points; and reporting drive test information to a base station at a preset reporting moment, wherein the drive test information comprises the related information of the another wireless short-distance communication device, the detection time points for the related information, and the network signal quality at each of the detection time points, wherein the UE comprises at least one of a Bluetooth (BT) device and a Wireless Fidelity (WIFI) device, the another wireless short-distance communication device comprises at least one of a BT device and a WIFI device, and each WIFI device comprises at least one of a WIFI access point (AP) and a WIFI station (STA).

2. The method of claim 1, wherein, in a case that the another wireless short-distance communication device comprises the BT device, the related information of the another wireless short-distance communication device comprises at least one of a Media Access Control (MAC) address and a signal strength of the BT device; and in a case that the another wireless short-distance communication device comprises the WIFI device, the related information of the another wireless short-distance communication device comprises at least one of a MAC address, a signal strength, and a Service Set Identifier (SSID) of the WIFI device.

3. The method of claim 1, further comprising one of:
predetermining the reporting moment with the base station; and
receiving configuration information from the base station, and acquiring the reporting moment from the configuration information.

4. A network performance detection method, performed by a base station, the method comprising:
receiving drive test information from user equipment (UE) indoors which is a device with a wireless short-distance communication function, wherein the drive test information comprises related information of another wireless short-distance communication device, detection time points for the related information, and network signal quality at each of the detection time points; and
determining a network coverage problem region according to the drive test information,
wherein the UE comprises at least one of a Bluetooth (BT) device and a Wireless Fidelity (WIFI) device, the another wireless short-distance communication device comprises at least one of a BT device and a WIFI device, and each WIFI device comprises at least one of a WIFI access point (AP) and a WIFI station (STA).

5. The method of claim 4, further comprising:
performing coverage enhancement on the network coverage problem region, after determining the network coverage problem region according to the drive test information.

6. The method of claim 4, wherein, in a case that the another wireless short-distance communication device comprises the BT device, the related information of the another wireless short-distance communication device comprises at least one of a Media Access Control (MAC) address and a signal strength of the BT device; and in a case that the another wireless short-distance communication device comprises the WIFI device, the related information of the another wireless short-distance communication device comprises at least one of a MAC address, a signal strength, and a Service Set Identifier (SSID) of the WIFI device.

7. The method of claim 6, wherein determining the network coverage problem region according to the drive test information comprises:
determining a region where the network signal quality is lower than a preset threshold to be the network coverage problem region.

8. The method of claim 4, further comprising one of:
predetermining with the UE a reporting moment for reporting the drive test information; and
sending configuration information to the UE to enable the UE to acquire from the configuration information a reporting moment for reporting the drive test information.

9. User equipment (UE), the UE being a device with a wireless short-distance communication function and comprising:
a processor; and
a memory storing instructions executable by the processor,
wherein the processor is configured to:
detect related information of another wireless short-distance communication device indoors;
record and store the related information of the another wireless short-distance communication device and detection time points for the related information;
record and store network signal quality at each of the detection time points; and
report drive test information to a base station at a preset reporting moment, wherein the drive test information comprises the related information of the another wireless short-distance communication device, the detection time points for the related information, and the network signal quality at each of the detection time points,
wherein the UE comprises at least one of a Bluetooth (BT) device and a Wireless Fidelity (WIFI) device, the another wireless short-distance communication device comprises at least one of a BT device and a WIFI device, and each WIFI device comprises at least one of a WIFI access point (AP) and a WIFI station (STA).

10. The UE of claim 9, wherein, in a case that the another wireless short-distance communication device comprises the BT device, the related information of the another wireless short-distance communication device comprises at least one of a Media Access Control (MAC) address and a signal strength of the BT device; and in a case that the another wireless short-distance communication device comprises the WIFI device, the related information of the another wireless short-distance communication device comprises at least one of a MAC address, a signal strength, and a Service Set Identifier (SSID) of the WIFI device.

11. The UE of claim 9, wherein the processor is further configured to perform one of:
predetermining with the base station the reporting moment for reporting the drive test information; and
receiving configuration information from the base station and acquiring, from the configuration information, the reporting moment for reporting the drive test information.

12. A base station, comprising:
a processor; and
a memory storing instructions executable by the processor,
wherein the processor is configured to perform the network performance detection method of claim 4.

13. The base station of claim 12, wherein the processor is further configured to:
perform coverage enhancement on the network coverage problem region after determining the network coverage problem region according to the drive test information.

14. The base station of claim 12, wherein, in a case that the another wireless short-distance communication device comprises the BT device, the related information of the another wireless short-distance communication device comprises at least one of a Media Access Control (MAC) address and a signal strength of the BT device; and
in a case that the another wireless short-distance communication device comprises the WIFI device, the related information of the another wireless short-distance communication device comprises at least one of a MAC address, a signal strength, and a Service Set Identifier (SSID) of the WIFI device.

15. The base station of claim 14, wherein the processor is further configured to:
determine a region where the network signal quality is lower than a preset threshold to be the network coverage problem region.

16. The base station of claim 12, wherein the processor is further configured to perform one of:
predetermining with the UE a reporting moment when the UE reports the drive test information; and
sending configuration information to the UE to enable the UE to acquire from the configuration information a reporting moment when the UE reports the drive test information.

* * * * *